United States Patent [19]

Csongor

[11] 4,447,156

[45] May 8, 1984

[54] MODULAR MIXING APPARATUS INCLUDING INTERCHANGEABLE FLUID PROCESSING MEANS

[75] Inventor: Desider G. Csongor, Rangley, Me.

[73] Assignee: 501 Northern Lights Trust, Raingeley, Me.

[21] Appl. No.: 298,065

[22] Filed: Aug. 31, 1981

[51] Int. Cl.³ .............................. B01F 7/08; B29B 1/06
[52] U.S. Cl. ......................................... 366/80; 366/82; 366/90; 366/319; 366/322; 425/208; 425/209
[58] Field of Search ....................... 366/79-82, 366/83-86, 87, 90, 322, 96-99, 100, 318, 319, 324; 425/207-209, 203, 205, 113; 264/174, 349, 176 R

[56] References Cited

U.S. PATENT DOCUMENTS 3,239,882 3/1966 Yokana .................................. 366/82
3,942,773 3/1976 Csongor ............................... 366/82

Primary Examiner—Timothy F. Simone
Attorney, Agent, or Firm—Hamilton, Brook, Smith & Reynolds

[57] ABSTRACT

A helically moving fluid body leaving an extruder screw and brought into contact with rotating shearing means, undergoes laminar displacement, is then guided through a stationary sleeve along undulating linear paths of travel of relatively short axial length, and thereafter undergoes further laminar displacement and discharges into a die.

During movement of the fluid mixture along the undulating linear paths of travel subdivision and blending of substantially all of the material in the fluid body, which is not in a fluid state, takes place. Thereupon the blended mixture is advanced to a die member at a desired fluidity and temperature in response to die requirements. Heating of the barrel is significantly reduced and energy conservation of an appreciable nature is achieved.

In carrying out mixing as noted above there is employed a modular mixing apparatus constructed with multiple processing means suitable for shearing, kneading, flow diverting, dispersing, blending and the like. The multiple processing means includes a basic component assembly with which other components may be employed interchangeably to deal with varying types of fluid or plastic bodies wherein solid material may be present.

12 Claims, 23 Drawing Figures

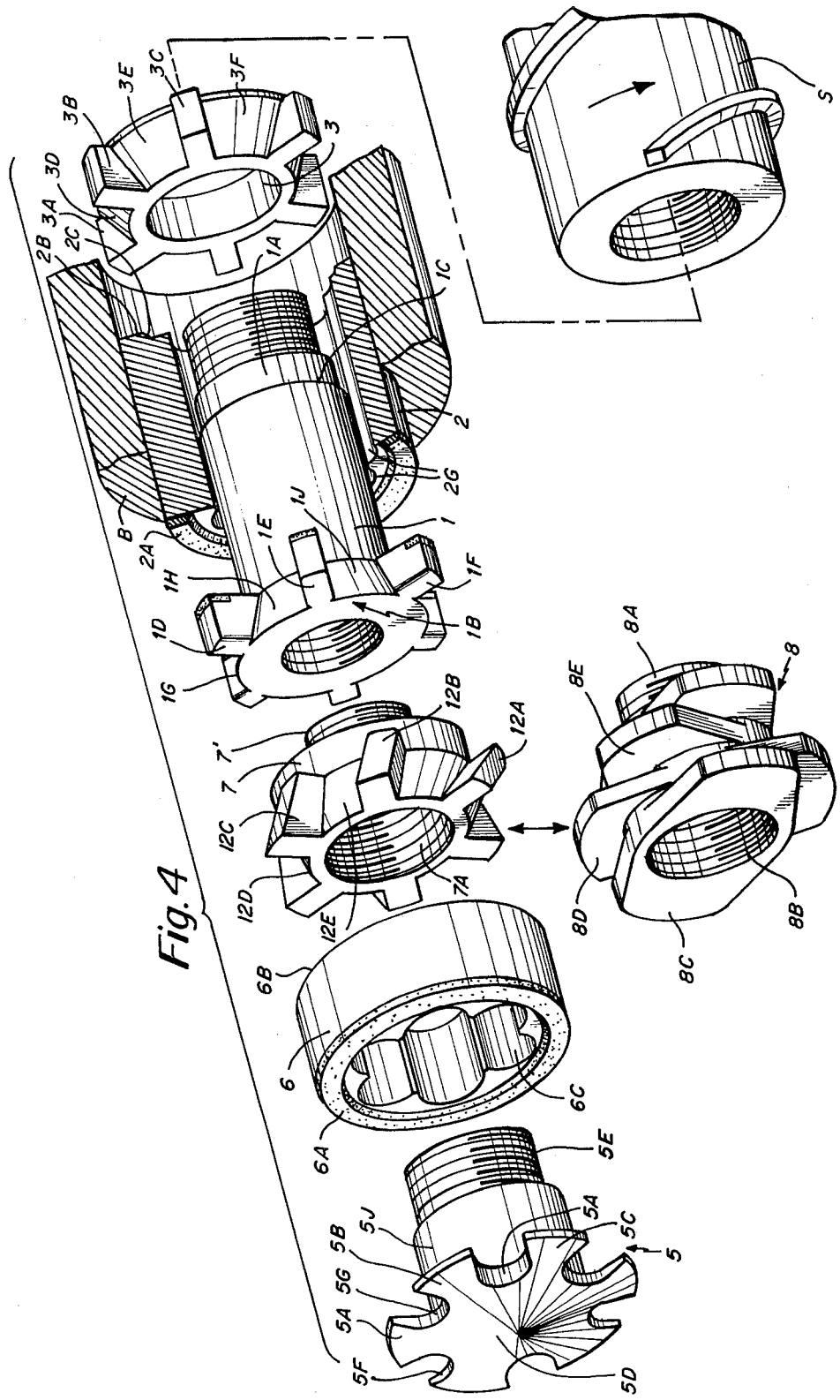

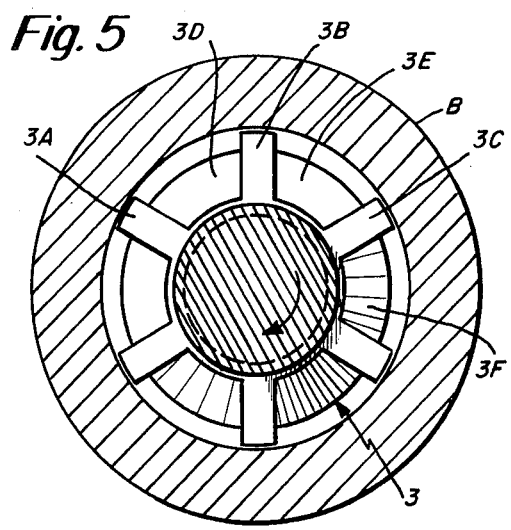
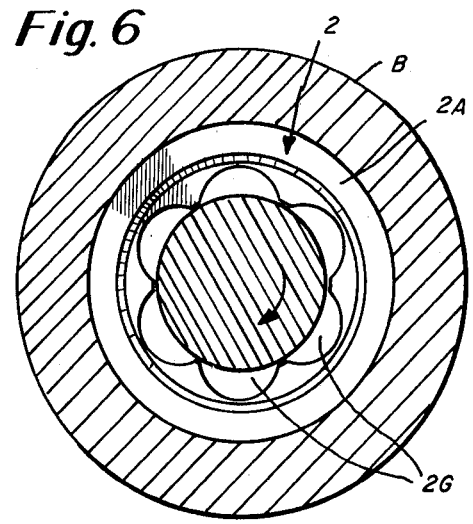
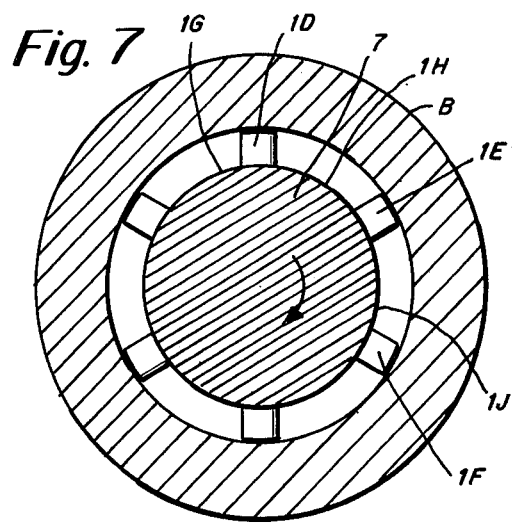
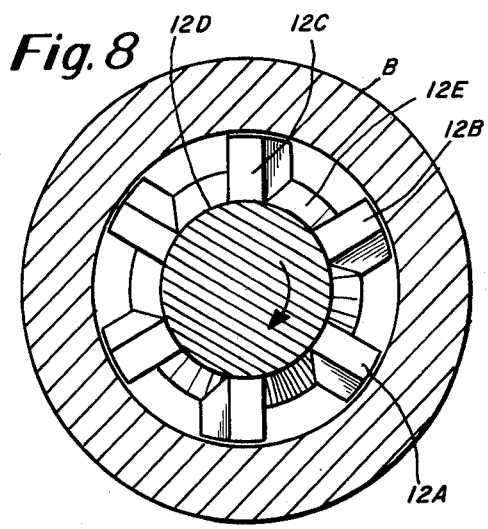
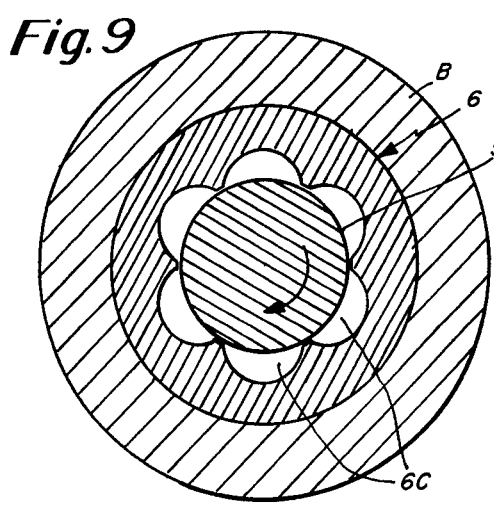
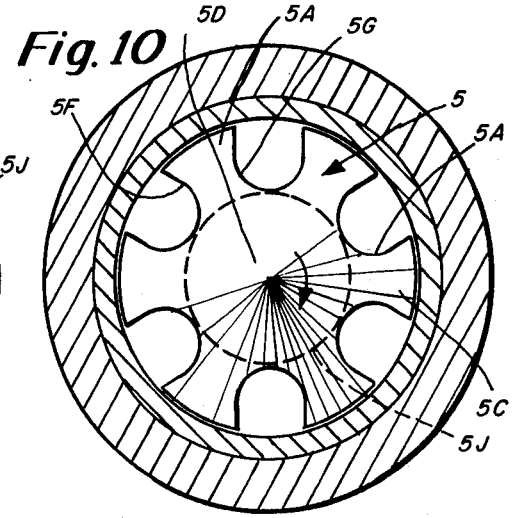

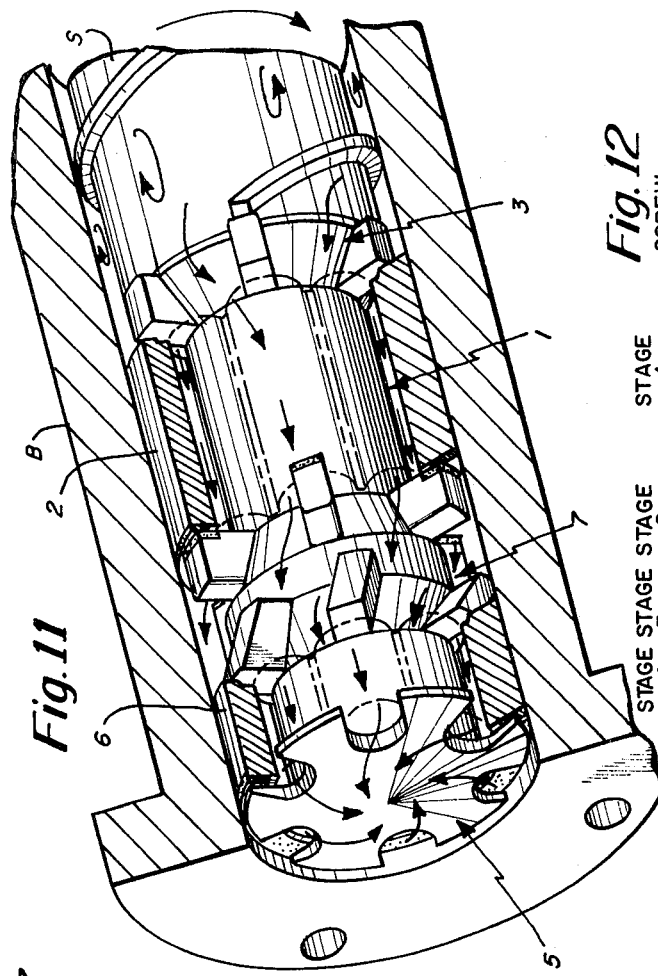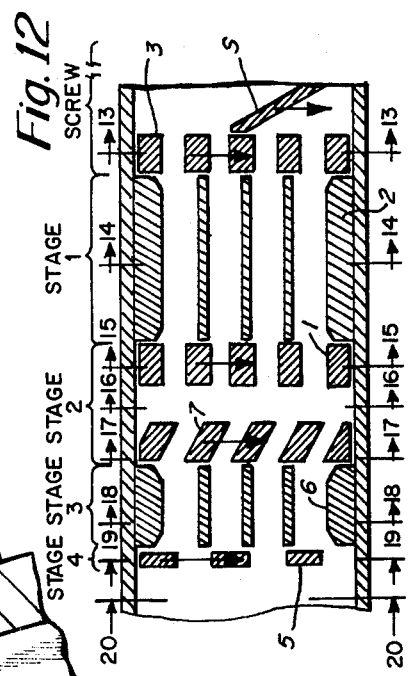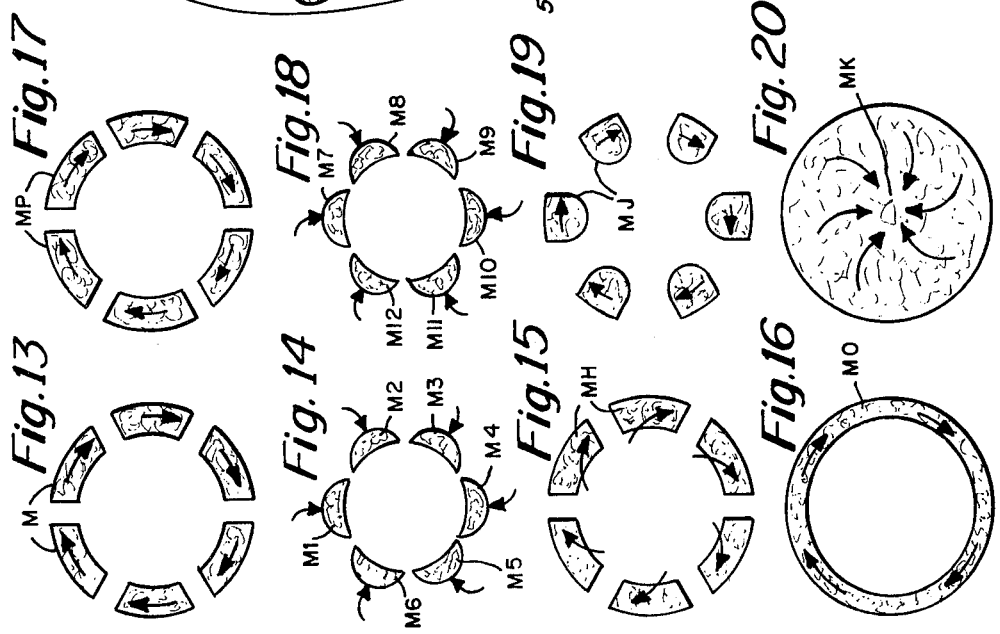

MODULAR MIXING APPARATUS INCLUDING INTERCHANGEABLE FLUID PROCESSING MEANS

FIELD OF THE INVENTION

Mixing a fluid or plastic mass with modifying agents, additives and the like to produce a homogeneous material is customarily attempted by mixing apparatus which is well known in the art and occurs in various forms. Conventional extruder screw and barrel apparatus is employed either separately or in conjunction with static flow diverting means. These conventional mixers and extruders are all shear dependent in that flow of plastic material may become channelized with hotter, less viscous material tending to run in channels along the central axis of the extruder section and cooler, more viscous material tending to adhere to extruder barrel portions at some points.

For example, with a conventional extruder screw having 24 turns, only 80% of the material may be melted by the first 12 turns, and the remaining 12 turns may produce only a 95% melt. Periodically the more viscous or unmelted material may become torn away from the barrel and swept into the die in which forming is to take place. To prevent this, more heating and pressure is often exerted through the extruder screw with excessive use of energy and undesirable increase in temperature of material in the barrel which can degrade some portions of the material. Thus the need exists for more complete melting and mixing which can be carried at localized points to deal with these difficulties and prevent lack of homogeneity in the molded product.

SUMMARY OF THE INVENTION

The present invention relates to an improved modular mixing apparatus and to improved methods of processing a fluid or plastic mixture wherein interchangeable processing modes are employed.

It is a chief object of the invention to provide improved methods and means for mixing fluid or plastic bodies.

Another object of the invention is to devise a modular mixing apparatus which combines a plurality of rotating shear ring means with a stationary sleeve element by means of which laminar displacement of a fluid material is achieved, then dispersed material is separated into spaced apart streams of material, and the spaced apart streams are further subdivided.

Still another object of the invention is to combine in a single rotating body a plurality of processing modes which may be selectively employed in the interchangeable relationship to one another to process fluid or plastic bodies of varying characteristics.

Another object is to provide means for retrofitting an extruder screw where an appreciable percentage of relatively viscous or unmelted characteristics resists mixing and blending and requires intensive extruder processing.

It has been determined that the foregoing objectives may be realized by laminar displacement of a fluid mass which is thereafter guided along undulating linear paths of travel of relatively short axial length, which material thereafter undergoes further laminar displacement.

The combined effect of laminar displacement of fluid material followed by travelling the displaced material along undulating linear paths of short axial length and to undergo further laminar displacement, operates to achieve a high degree of intimate mixing and blending by which substantially all material in the fluid mass which is not in a fluid state is converted into a part of a homogeneous product.

BRIEF DESCRIPTION OF THE DRAWINGS

FIG. 4 is an exploded view showing in further detail the component parts of the modular extruder apparatus shown in FIGS. 2 and 3.

FIG. 5 is a cross section taken on the line 5—5 of FIG. 3.

FIG. 6 is a cross section taken on the line 6—6 of FIG. 3.

FIG. 7 is a cross section taken on the line 7—7 of FIG. 3.

FIG. 8 is a cross section taken on the line 8—8 of FIG. 3.

FIG. 9 is a cross section taken on the line 9—9 of FIG. 3.

FIG. 10 is an end elevational view showing a dispersing tip element in the modular mixing apparatus.

FIG. 11 is a fragmentary perspective view showing the component parts of the mixing apparatus of FIGS. 2 and 3 and indicating portions of a barrel member having been broken away to indicate by arrows a changing flow of material along undulating paths of travel of short axial length.

FIG. 12 is a fragmentary cross-sectional view showing portions of the mixing apparatus and indicating rotational direction of the various modules.

FIG. 13 is a cross sectional view taken on the line 13—13 of FIG. 12 illustrating diagrammatically one path of flow of fluid material.

FIG. 14 is another view taken on the line 14—14 of FIG. 12.

FIGS. 15, 16, 17, 18, 19 and 20 are additional views similar to FIG. 13 but taken on respective cross sectional lines 15—15, 16—16, 17—17, 18—18, 19—19 and 20—20.

DETAILED DESCRIPTION OF THE INVENTION

In general the modular mixing apparatus of the invention includes: (1) a main shaft which is engaged with a threaded end of an extruder screw and rotatable therewith, (2) spaced apart shear ring elements rotatable with the shaft, and (3) a stationary shearing control sleeve which is located between the shear ring elements, disposed around the driver shaft, and fixed to an outer extruder barrel component of the apparatus.

This basic component assembly is made use of to carry out multi-stage mixing in a rapid and unique manner. A helically moving fluid body in an extruder screw and barrel apparatus is brought into contact with rotating shear ring means to undergo laminar displacement; it is then guided through a stationary shearing control sleeve along undulating linear paths of travel of relatively short axial length; and thereafter undergoes further laminar displacement by shear ring means.

Figure 1:
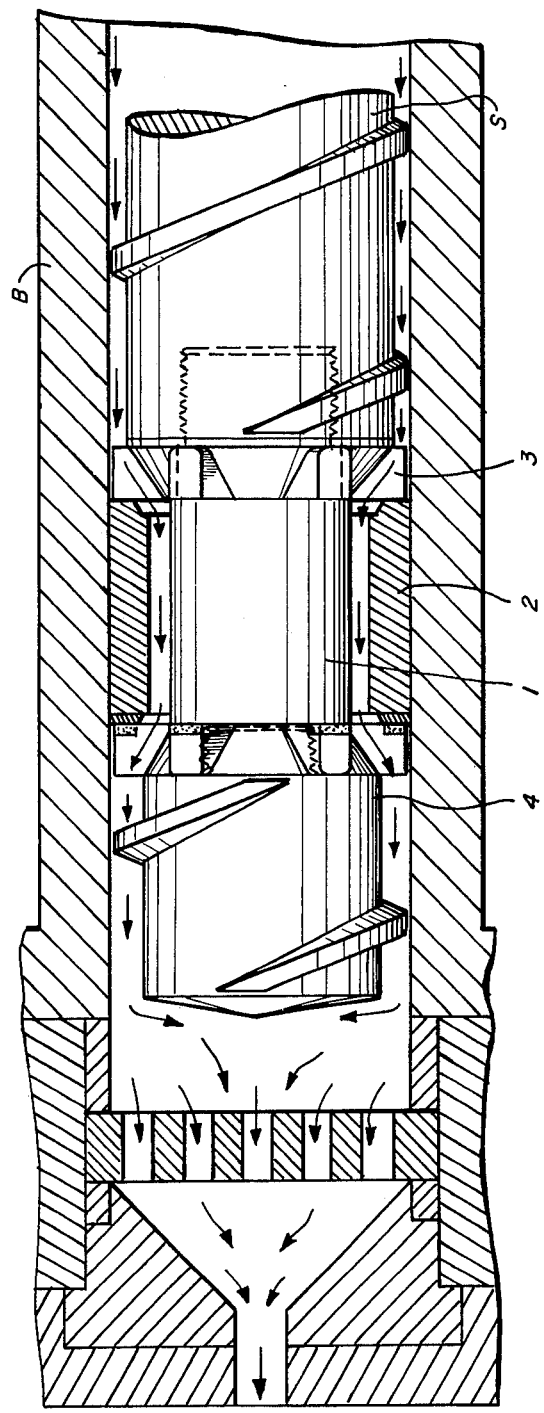
FIG. 1 is an elevational view illustrating a basic component assembly of one desirable form of modular extruder apparatus of the invention combined with an extruder barrel which is shown fragmentarily.

Referring in more detail to the Figures shown in the drawings, FIG. 1 illustrates the modular mixing apparatus of the invention in one basic form. FIGS. 2–23 illustrate other modular mixing apparatus having various processing means combined in one form or another with a basic component assembly of parts 1, 2, 3, and 1A.

Figure 2:
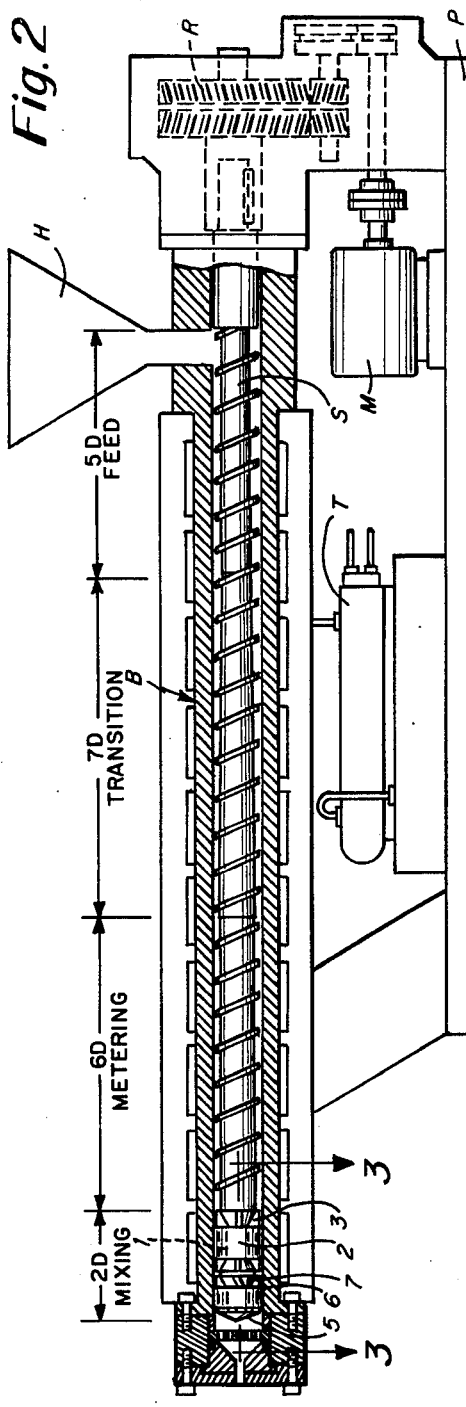
FIG. 2 is a diagrammatic view of conventional plastic processing apparatus including an extruder screw, an extruder barrel and portions of a dye shown in cross section with which a modular mixing apparatus of the invention is combined.

The apparatus of FIG. 2 may, for example, be supported on a bed plate P and may include a feed section having a hopper H into which plastic material is furnished in the usual manner to an extruder screw S received within a barrel B and power driven through a reduction gearing R by a motor M. T denotes thermal control means in communication with the extruder barrel B.

It is customary to construct extruder screws such as the screw S with a predetermined length to diameter ratio. As shown in FIG. 2 diagrammatically, screw S may have a length which is twenty times the diameter of the screw S including a feed section of five diameters, a transition section of seven diameters, a metering section of six diameters and a mixing section of two diameters.

In this mixing section of two diameters is located the modular mixing apparatus of the invention and it should be understood that this modular mixing apparatus as hereinafter described in detail may be combined with an extruder screw having a length of 18 diameters or other lengths as an original construction. However, where it is desired to modify a screw having some given length such as a length of 20 diameters, or some other number of diameters, the screw may be cut to a length of 18 diameters, for example, and then retrofitted with the modular mixing apparatus of the invention by internally threading the cutt off end of the screw S and attaching a reduced threaded end of the invention mixer apparatus therein.

Considering in further detail the basic component assembly shown in FIG. 1, numeral 1 denotes a main shaft having a reduced threaded extremity 1A which is securely engaged in an internally threaded end of screw S. An opposite end of main shaft 1 has integrally formed therewith a shear ring portion 1B. Located around shaft 1 in spaced relation thereto is a stationary shear control sleeve 2. This sleeve 2 is fixed against an inner peripheral surface of the barrel B. This may be accomplished, for example, by forming sleeve 2 of a metal having a coefficient of expansion greater than the coefficient of expansion of the metal in barrel B.

Sleeve 2 is also positioned with one end in abutting relation to the shear ring portion 1B. At an opposite end of sleeve 2, and in abutting relationship therewith, is a separately formed shear ring element 3 which is solidly secured between the extruder screw S and an annular shoulder portion 1C of shaft 1 and is rotatable therewith.

Figure 3:
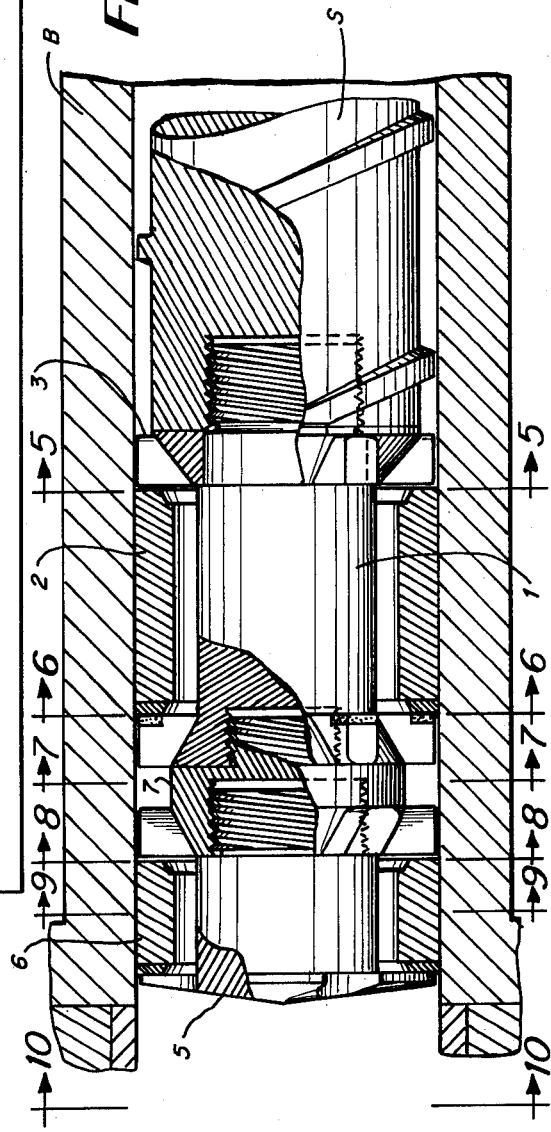
FIG. 3 is a cross section taken on the line 3—3 of FIG. 2.
Figure 21:
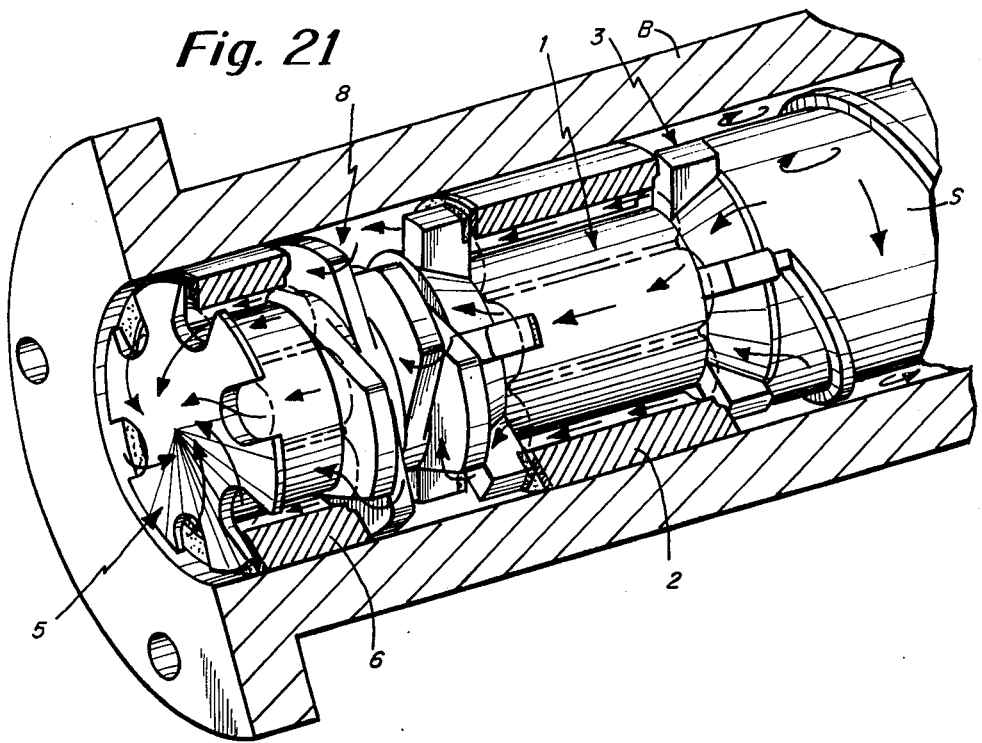
FIG. 21 is a fragmentary cross sectional view of a modified form of mixing apparatus of the invention and particularly showing the combination of kneading block apparatus combined with the rotating screw driver shaft.
Figure 22:
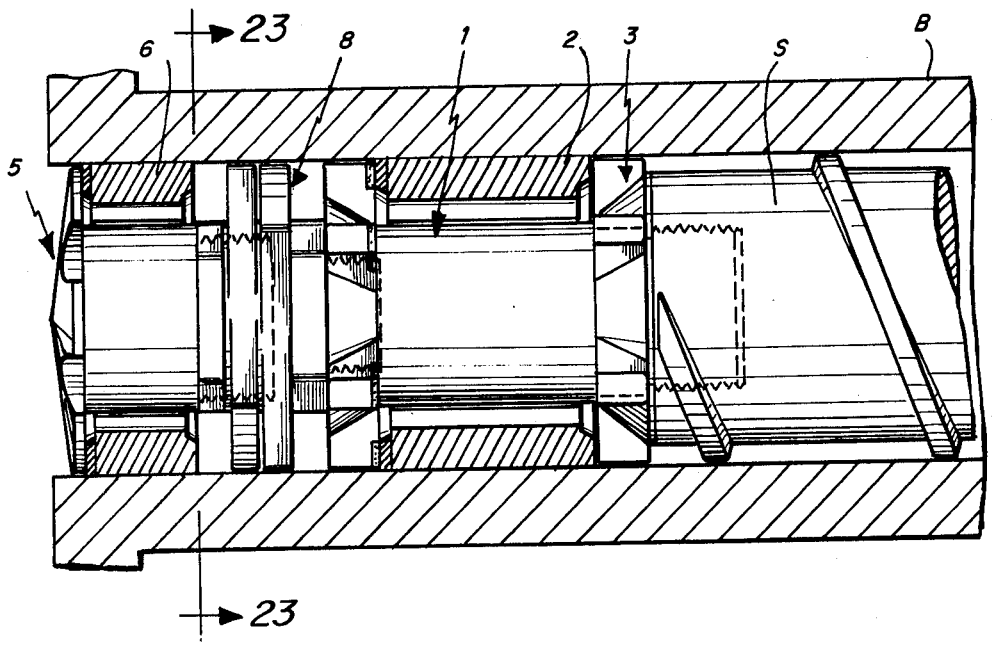
FIG. 22 is a fragmentary cross sectional view of a barrell member showing mixing apparatus of the invention corresponding to the assembly shown in FIG. 21.
Figure 23:
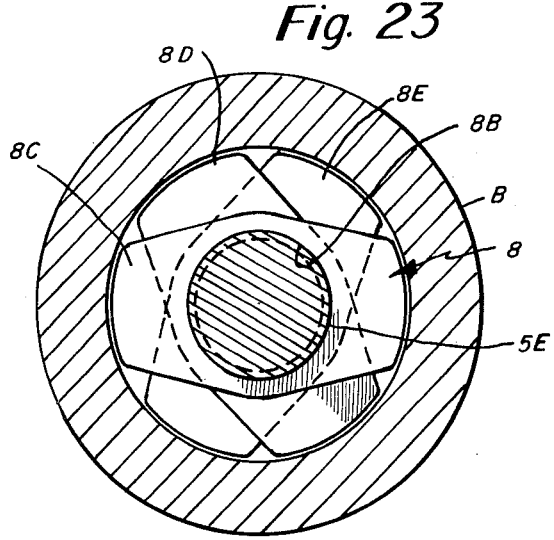
FIG. 23 is a cross section taken on the line 23—23 of FIG. 22.

This basic component assembly including the main shaft 1, sleeve 2 and shear ring means 1 and 1B is also shown in FIGS. 2, 3 and 4 combined with other modular components for another processing mode and is still further shown in FIGS. 21–23 combined with different component means and still other processing modes.

It will be understood that opposite ends of the stationary sleeve 2 will be subjected to wear when the shear ring portions 1B and separately formed shear ring 3 are being rotated by main shaft 1. To prevent such wear the sleeve 2, in one preferred embodiment, may have opposite ends thereof provided with hardened bearing portions as 2A and 2B.

Extending inwardly of sleeve 2 and downwardly from the hardened bearing portions 2B is a conical surface 2C. Similarly, extending inwardly and downwardly from bearing 2A is another conical surface 2D. These conical surfaces are formed to provide for controlling the thickness of laminar displacement carried out by movement of the shear ring 3 and shear ring portion 1B. Increasing or decreasing the depth of these conical surfaces varies the thickness of each laminar cut off by a blade and provides a desirable range of thickness controlled.

As noted above, the sleeve 2 has an inner peripheral surface occurring in spaced relation to the main shaft 1 and this inner peripheral surface is further constructed with spaced apart axially extending grooves as 2G, more clearly shown in FIGS. 4 and 9. These grooves function to receive sheared portions of fluid material cut off by the shearing blades and to provide for a plurality of streams of material being diverted and guided along a plurality of linear paths of travel between the sleeve and the shaft 1.

An important feature of the invention is the combination of a stationary sleeve having conical shear control surfaces and flow diverting grooves as described above with spaced apart shear ring means of a unique construction.

Thus, the shear ring 3 is formed with radially extending shearing blades as 3A, 3B, 3C, etc. These shearing blades are spaced apart to provide passageways through which extruded material may pass. Extending between the blades 3A, 3B, 3C, etc. are inwardly inclined sloping surfaces as 3D, 3E, 3F, etc. Similarly, the shear ring portion 1B is formed with radially extending shearing blades as 1D, 1E, 1F, etc. and are spaced apart to provide passageways for fluid flow and extending between the blades are sloping surfaces 1G, 1H, 1I, etc. which are inclined upwardly, as shown more clearly in FIGS. 4 and 11. The arrangement of parts of FIGS. 4 and 11 is also shown diagrammatically in FIG. 12.

As a result of this arrangement of parts there is realized periodically undulating flow of material which is successively interrupted to undergo laminar displacement and thereby an intensified mixing is achieved. This intensified mixing is highly effective in subdividing material which is not in a fluid state and which may tend to accumulate at points near the end of an extruder screw as indicated in FIG. 2.

In operating the apparatus of FIG. 1 a helically moving extruded mass of fluid material is advanced through the extruder barrel B by the extruder screw S and portions of the helically moving mass move into the spaces between the blades of shear ring 3. FIG. 13 illustrates the portions of material in diagrammatic form.

Immediately thereafter these portions of material are subjected to laminar displacement. The thickness of each of the laminae displaced is regulated by the depth of the conical surface 2D of sleeve 2.

Thereafter, the displaced material becomes guided along grooved surfaces of sleeve 2 as spaced apart streams of material which travel in linear paths of relatively short axial length. FIG. 14 shows diagrammatically these separated streams of material denoted by reference characters M1, M2, M3, M4, M5 and M6.

Thereafter, the streams of material are continuously subdivided by a second stage of laminar displacement carried out by shear ring portion 1B. FIG. 15 indicates diagrammatically flow of displaced material M8.

Portions of material thus subdivided is merged together in a helically moving mass MO as suggested diagrammatically in FIG. 16 and quickly undergoes another step of laminar displacement by shear ring 7 as indicated diagrammatically by portions of material MP in FIG. 17.

In the processing mode illustrated in FIG. 1 the metering module 4 discharges the finally mixed and blended product described which is shown for example at the end of the apparatus illustrated in FIG. 2.

In FIG. 4 there is illustrated a processing mode by means of which increased shearing and mixing may be carried out depending upon the material being dealt with. In this modular mixing apparatus the same component assembly is employed including the main shaft 1, sleeve 2 and shear ring means 3 and 1B.

However, in place of the metering screw 4 there is attached another shear ring member 7 having a threaded end 7' which is threaded into the internally formed threads of ring portion 1A to become rotatable therewith. The member 7 is formed with internally constructed threads as 7H and have outwardly projecting shearing blades as 12A, 12B, 12C, etc. These blades, unlike the blades of ring portion 1A, are not parallel to the central axis of the extruder screw but are skewed and extend angularly with respect to the central longitudinal axis of the ring 7.

It has been found that an acceleration flow of material may be realized by these angularly disposed blades. Also, desirable results may be obtained by combining these shearing blades with another sleeve member 6 to carry out a progressively extended stage of shearing as member 7 is rotated around the end of the sleeve 6 which has hardened the bearing portions as 6A and 6B earlier described. It will also be noted that the thickness of laminar displacement of fluid material is again regulated by conical surfaces as 6D.

Still another stage of shearing is obtained by the use of a diffuser tip 5 which has spaced apart shearing blades rotatable around the sleeve 6. The member 5 is formed with a threaded end 5E which is detachably secured in threaded relationship with member 7. The member 5 is also shaped with a conical end face and material passing through the openings denoted by arrow 5 in the extruder tip tend to be forced along converging paths of travel for desirable communication with the die member.

Material passing through the blades of shear ring 7 again enter a the stationary sleeve 6 and quickly undergo another step of laminar displacement by shear ring 7 and become guided along the grooved surfaces of the stationary sleeve 6 to provide spaced apart streams as suggested diagrammatically in FIG. 18 and denoted by the reference characters M7, M8, M9, M10, M11 and M12.

A final step of laminar displacement to subdivide these streams of material is carried out by movement of the dispersing tip 5 against the stationary sleeve 6 and this provides portions as MJ indicated diagrammatically in FIG. 19. A resulting mixture MK is then led through the dispersing tip and leaves the tip as a converging stream indicated by the arrows in FIG. 20. In FIG. 21 another mode of mixing has been illustrated in which there is employed the same basic component assembly including parts 1, 2, 3, and 1B; however in place of the second shear ring 7 there is mounted in the threaded end of shear ring 1B a kneading rotor denoted by numeral 8 which is rotatable against the stationary sleeve 6, as shown in FIGS. 21, 22 and 23. The kneading rotor component 8 is formed with a threaded end 8A and is provided with internal threads 8B. It will be noted that the kneading rotor is constructed with oblong shaped bars or arms which extend radially outward and occur in angularly disposed relationship with respect to one another, as shown in FIGS. 4, 21, 22 and 23. It has been found that a kneading and and streatching of some fluid masses at this point in the processing can be carried out to provide further desirable attenuation and mixing of certain fluid materials.

I claim:

1. Improved modular mixing apparatus for use with an extruder screw and barrel assembly to extrude fluid material, said apparatus including a rotatable driver shaft having a threaded end for engagement with the extruder screw, stationary sleeve means located around the driver shaft in spaced relation thereto and presenting opposite bearing ends, shear ring elements rotatable with the driver shaft and occurring in abutting relationship to the opposite bearing ends of the stationary sleeve, and fluid processing means detachably connected to the driver shaft.

2. The invention of claim 1 in which one of the shear ring elements is formed integrally with the driver shaft and is further provided with an internally threaded portion in which the fluid processing means is detachably secured.

3. The invention of claim 2 in which the fluid processing means includes an additional shear ring element and fluid discharge means.

4. The invention of claim 3 in which the fluid processing means further includes a fluid kneading rotor detachably secured between the additional shearing means and the fluid discharge means.

5. The invention of claim 4 in which the fluid processing means further includes a stationary sleeve detachably secured between the kneading rotor and the fluid discharge means.

6. The invention of claim 5 in which the fluid discharge means consists in a rotating fluid dispersing tip.

7. The invention of claim 1 in which the stationary sleeve is internally recessed to form axially extending grooves along which spaced apart streams of fluid material may be guided.

8. The invention of claim 1 in which the stationary sleeve is internally recessed to form axially extending grooves along which spaced apart streams of said fluid material may be guided, one of said shear ring elements constructed with spaced apart shear ring blades through which sheared material is directed into the axially extending grooves, and said bearing ends of the stationary sleeve having inner peripheral surfaces thereof formed with conical portions.

9. Improved modular mixing apparatus for use with an extruder screw and barrel assembly, said apparatus including a rotatable driver shaft having a threaded end for engagement with the extruder screw, stationary sleeve means located around the driver shaft in spaced relation thereto and presenting opposite bearing ends, shear ring elements rotatable with the driver shaft and occurring in abutting relationship to said opposite bearing ends of the stationary sleeve, one of said shear ring elements being detachably secured to the driver shaft and the other of the said shear ring elements being formed integrally with the driver shaft, and fluid processing means detachably connected to the driver shaft, one of said shearing elements being formed integrally with the driver shaft and being further provided with an internally threaded portion in which the fluid processing means is detachably secured and said fluid processing means including additional shearing means in threaded engagement with the said integrally formed ring element of the driver shaft, a fluid dispersing tip in threaded engagement with the additional shearing means and a stationary sleeve fixed between the dispersing tip and the said additional shearing means.

10. Improved modular mixing apparatus for use with an extruder screw and barrel assembly, said apparatus including a rotatable driver shaft having a threaded end for engagement with the extruder screw, stationary sleeve means located around the driver shaft in spaced relation thereto and presenting opposite bearing ends, shear ring elements rotatable with the driver shaft and occurring in abutting relationship to said opposite bearing ends of the stationary sleeve, one of the shear ring elements being detachably secured to the driver shaft and the other of the said shear ring elements being formed integrally with the driver shaft, and fluid processing means detachably connected to the driver shaft, one of the shear ring elements being formed integrally with the driver shaft and formed with an internally threaded portion in which the fluid processing means is detachably secured, said integrally formed shearing element presenting shearing blades which are spaced apart by surfaces which converge with respect to the central axis of the driver shaft, a separately formed shearing element located around a reduced portion of the driver shaft and rigidly held between the driver shaft and the extruder screw, said separately formed shearing ring element presenting shearing blades which are spaced apart to define surfaces which converge with respect to the central axis of the driver shaft.

11. Improved modular mixing apparatus for use with an extruder screw and a barrel in which a fluid body is confined and moved in a helical direction, said apparatus comprising a combination of shearing components arranged to constitute a shearing module and including a driver shaft having a threaded extremity engageable within the extruder screw and rotatable therewith, an opposite extremity of the driver shaft being formed with a shear ring portion and presenting spaced apart shearing blades which are separated by surfaces which converge with respect to the central axis of the driver shaft, a sleeve member located in spaced relationship around the driver shaft and fixed inside the extruder barrel in abutting relation to the shearing blades, a separately formed shear ring element supported on a reduced drive shaft part and rigidly held on the drive shaft against an end of the said thermal control sleeve, said separately formed shear ring element having spaced apart shearing blades and surfaces therebetween which diverge with respect to the central axis of the driver shaft and a dispersing tip element detachably secured in the said shear ring portion of the driver shaft.

12. Improved modular mixing apparatus for use with an extruder screw and barrel assembly, said apparatus including a rotatable driver shaft having a threaded end for engagement with the extruder screw, stationary sleeve means located around the driver shaft in spaced relation thereto, shear ring elements rotatable with the driver shaft and occurring in abutting relationship to opposite ends of the stationary sleeve, and fluid processing means detachably connected to the driver shaft, one of said shear ring elements being separately formed and presenting spaced apart shearing blades separated by guide surfaces which converge with respect to the central axis of the driver shaft, the other of the shear ring elements being formed as an integral part of the driver shaft and presenting shearing blades separated by surfaces which diverge with respect to the central axis of the driver shaft, said stationary sleeve means being formed with axially extending grooves and said sleeve and shear ring elements cooperating to produce an undulating flow of material between the sleeve and the driver shaft in an undulating linear path of travel.

* * * * *